(12) United States Patent
Moorjani et al.

(10) Patent No.: US 10,613,825 B2
(45) Date of Patent: Apr. 7, 2020

(54) PROVIDING ELECTRONIC TEXT RECOMMENDATIONS TO A USER BASED ON WHAT IS DISCUSSED DURING A MEETING

(71) Applicant: GetGo, Inc., Boston, MA (US)

(72) Inventors: Yogesh Moorjani, Dublin, CA (US); Ashish V. Thapliyal, Santa Barbara, CA (US)

(73) Assignee: LogMeIn, Inc., Boston, MA (US)

( * ) Notice: Subject to any disclaimer, the term of this patent is extended or adjusted under 35 U.S.C. 154(b) by 350 days.

(21) Appl. No.: 14/953,915

(22) Filed: Nov. 30, 2015

(65) Prior Publication Data

US 2017/0154030 A1 Jun. 1, 2017

(51) Int. Cl.

| | |
|---|---|
| *G06F 3/0482* | (2013.01) |
| *G06F 3/16* | (2006.01) |
| *H04W 4/16* | (2009.01) |
| *H04M 3/56* | (2006.01) |
| *H04L 29/06* | (2006.01) |
| *G06F 17/27* | (2006.01) |
| *G06F 17/24* | (2006.01) |

(52) U.S. Cl.
CPC ............ *G06F 3/167* (2013.01); *G06F 17/24* (2013.01); *G06F 17/276* (2013.01); *H04L 65/1083* (2013.01); *H04L 65/1096* (2013.01); *H04L 65/403* (2013.01); *H04M 3/567* (2013.01); *H04W 4/16* (2013.01); *H04M 2203/357* (2013.01)

(58) Field of Classification Search
CPC ..... G06F 17/2705; G06F 3/167; G06F 3/0482
See application file for complete search history.

(56) References Cited

U.S. PATENT DOCUMENTS

| | | | | |
|---|---|---|---|---|
| 6,412,012 B1* | 6/2002 | Bieganski | .............. | G06Q 30/02 709/232 |
| 6,895,552 B1* | 5/2005 | Balabanovic | ......... | G06F 16/583 715/209 |
| 7,644,427 B1* | 1/2010 | Horvitz | .................. | H04H 60/37 725/13 |
| 8,171,043 B2* | 5/2012 | Murdock | .......... | G06F 17/30265 707/748 |

(Continued)

*Primary Examiner* — Phenuel S Salomon
(74) *Attorney, Agent, or Firm* — BainwoodHuang

(57) ABSTRACT

A computer-implemented technique provides electronic text recommendations to a user. The technique involves capturing content from a conference among multiple participants. The technique further involves receiving electronic typing input from the user while the user is typing to document the conference. The technique further involves outputting, in response to the electronic typing input from the user, electronic text recommendations to the user based on the captured content. Such recommendations can take the form of predictive typing for taking notes based on content shared during an online meeting. The words and/or phrases in the predictive typing may be derived from the words spoken and/or from visual data displayed during the conference. Accordingly, a user is able to document what is discussed with minimal typing and thus reduced distraction. Furthermore, the information that is documented can be made more on-point and less verbose than a lengthy transcription of an audio feed.

18 Claims, 5 Drawing Sheets

(56) References Cited

U.S. PATENT DOCUMENTS

| | | | |
|---|---|---|---|
| 8,249,948 B1* | 8/2012 | Kane, Jr. | G06Q 30/02 705/26.7 |
| 8,706,643 B1* | 4/2014 | Jesensky | G06Q 20/401 704/9 |
| 8,775,415 B2* | 7/2014 | Jeon | H04N 5/44543 707/721 |
| 8,781,841 B1 | 7/2014 | Wang | |
| 8,893,023 B2 | 11/2014 | Perry et al. | |
| 8,903,719 B1* | 12/2014 | Landry | G06F 17/21 704/10 |
| 8,965,754 B2 | 2/2015 | Jones et al. | |
| 9,129,088 B1* | 9/2015 | Baschy | G06F 21/10 |
| 9,129,258 B2* | 9/2015 | Alexandrov | G06Q 10/10 |
| 9,165,257 B2 | 10/2015 | Badger et al. | |
| 9,232,063 B2 | 1/2016 | Romano et al. | |
| 9,244,905 B2 | 1/2016 | Joshi et al. | |
| 9,256,649 B2* | 2/2016 | Patton | G06F 17/3097 |
| 9,262,935 B2* | 2/2016 | Nielson | A61B 5/162 |
| 9,270,711 B1* | 2/2016 | Rowland | H04L 12/1818 |
| 9,318,113 B2 | 4/2016 | Westby et al. | |
| 9,852,478 B2* | 12/2017 | Herzig | G06Q 50/01 |
| 9,959,328 B2* | 5/2018 | Jain | G06F 17/30554 |
| 10,109,092 B1* | 10/2018 | Hitchings, Jr. | G06T 11/60 |
| 2002/0126120 A1* | 9/2002 | Snowdon | G06F 1/16 345/440 |
| 2003/0215142 A1* | 11/2003 | Gounares | G06F 3/0481 382/190 |
| 2004/0225716 A1* | 11/2004 | Shamir | G06F 17/30873 709/204 |
| 2005/0246653 A1* | 11/2005 | Gibson | G06F 16/957 715/773 |
| 2006/0026502 A1* | 2/2006 | Dutta | G06Q 10/10 715/230 |
| 2006/0048047 A1* | 3/2006 | Tao | G06F 17/241 715/232 |
| 2006/0247915 A1* | 11/2006 | Bradford | G06F 3/0481 704/1 |
| 2007/0061717 A1* | 3/2007 | Cragun | G06F 16/34 715/234 |
| 2008/0077570 A1* | 3/2008 | Tang | G06F 16/3344 |
| 2008/0133600 A1* | 6/2008 | Uehori | G06Q 10/10 |
| 2008/0189232 A1* | 8/2008 | Dunning | G06N 20/00 706/45 |
| 2008/0195388 A1* | 8/2008 | Bower | G06F 3/0237 704/243 |
| 2008/0262910 A1* | 10/2008 | Altberg | G06Q 30/02 705/14.69 |
| 2008/0294982 A1* | 11/2008 | Leung | G06F 17/276 715/261 |
| 2009/0106695 A1* | 4/2009 | Perry | G06F 17/24 715/816 |
| 2009/0192845 A1* | 7/2009 | Gudipaty | G06Q 10/10 705/7.19 |
| 2009/0228777 A1* | 9/2009 | Henry | G06F 17/30017 715/230 |
| 2011/0246496 A1* | 10/2011 | Chung | G06F 16/951 707/766 |
| 2011/0264745 A1* | 10/2011 | Ferlitsch | G06Q 10/109 709/205 |
| 2011/0270923 A1* | 11/2011 | Jones | G06F 3/0421 709/204 |
| 2011/0271192 A1* | 11/2011 | Jones | G06F 3/0421 715/727 |
| 2011/0271197 A1* | 11/2011 | Jones | G06Q 10/101 715/739 |
| 2011/0289433 A1* | 11/2011 | Whalin | G06F 17/30964 715/753 |
| 2011/0320548 A1* | 12/2011 | Jonsson | G06F 3/0237 709/206 |
| 2012/0101811 A1* | 4/2012 | Griffin | G06F 17/2735 704/10 |
| 2012/0109966 A1* | 5/2012 | Liang | G06F 17/30873 707/740 |
| 2012/0117082 A1* | 5/2012 | Koperda | G06F 16/3331 707/748 |
| 2012/0173222 A1* | 7/2012 | Wang | G06F 17/273 704/2 |
| 2013/0110925 A1* | 5/2013 | Wessling | G06Q 10/109 709/204 |
| 2013/0144605 A1* | 6/2013 | Brager | G06F 17/28 704/9 |
| 2013/0225236 A1* | 8/2013 | Lee | G06F 17/30265 455/556.1 |
| 2013/0275429 A1* | 10/2013 | York | G06F 17/30029 707/737 |
| 2014/0108200 A1* | 4/2014 | Ning | G06Q 30/0625 705/26.62 |
| 2014/0142926 A1* | 5/2014 | Jones | G06F 17/276 704/10 |
| 2014/0149424 A1* | 5/2014 | Kalmes | G06F 17/30029 707/748 |
| 2014/0163954 A1* | 6/2014 | Joshi | G06F 3/0237 704/9 |
| 2014/0278405 A1* | 9/2014 | Peters | G10L 15/1822 704/235 |
| 2014/0282089 A1* | 9/2014 | West | H04L 65/403 715/753 |
| 2014/0282244 A1* | 9/2014 | Speer | G06F 3/04842 715/811 |
| 2015/0100453 A1* | 4/2015 | Romero | G06Q 30/0631 705/26.7 |
| 2015/0130960 A1* | 5/2015 | Minamino | H04N 5/23245 348/220.1 |
| 2015/0262069 A1* | 9/2015 | Gabriel | G06F 17/30867 706/48 |
| 2015/0341695 A1* | 11/2015 | Pattan | H04L 12/1822 725/86 |
| 2015/0348538 A1* | 12/2015 | Donaldson | G10L 15/08 704/235 |
| 2015/0378995 A1* | 12/2015 | Brown | H04L 12/1827 707/608 |
| 2016/0086104 A1* | 3/2016 | Wouhaybi | G06Q 10/02 705/5 |
| 2016/0224524 A1* | 8/2016 | Kay | G06F 16/252 |
| 2016/0283481 A1* | 9/2016 | Morley | G06Q 30/0256 |
| 2017/0132518 A1* | 5/2017 | Kitada | G06N 5/022 |
| 2017/0310826 A1* | 10/2017 | Gunasekar | G06Q 10/10 |
| 2018/0203923 A1* | 7/2018 | Fife | G06F 17/27 |

\* cited by examiner

| Term Field 222 (e.g., Words, Phrases, Phonemes, Acronyms, etc.) | Timestamp of Last Detection Field 224 | Times Recently Encountered Field 226 | Total Times Encountered Field 228 | Total Times Selected Field 230 | Other Fields 232 |
|---|---|---|---|---|---|
| "cholesterol" | 2015-08-05:12:34:48 | 12 | 23 | 15 | ... |
| "cardiovascular disease" | 2015-08-05:12:31:22 | 2 | 5 | 3 | ... |
| "systolic blood pressure" | 2015-08-05:12:37:26 | 3 | 8 | 0 | ... |
| "triglycerides" | 2015-08-05:12:30:33 | 7 | 11 | 2 | ... |
| "diastolic blood pressure" | 2015-08-05:12:37:03 | 4 | 8 | 0 | ... |
| ... | ... | ... | ... | ... | ... |

FIG. 4

PROVIDING ELECTRONIC TEXT RECOMMENDATIONS TO A USER BASED ON WHAT IS DISCUSSED DURING A MEETING

BACKGROUND

A conventional web conference involves sharing content among multiple conference attendees. In particular, the conference attendees are able to view visual content (e.g., slides of a slide show, pages of a document, etc.), as well as share audio content (e.g., ask questions and inject comments) to form a collaborative exchange even though each conference attendee may reside in a different geographical location.

For such a web conference, a conference attendee might want to take notes. In one conventional approach, a conference attendee manually types notes during the web conference. In another conventional approach, a conference attendee records audio of the web conference, and then generates an electronic transcription of the web conference from the recorded audio.

SUMMARY

Unfortunately, there are deficiencies to the above-described conventional approaches to saving web conference notes. Along these lines, in the above-described conventional manual typing approach, manually typing during a web conference can be distracting to both the person typing as well as to the other conference attendees (e.g., the person typing must focus on manually typing, the other conference attendees may be distracted by excessing typing noise, etc.). Additionally, in the above-identified conventional electronic transcription approach, the electronic transcription generated from the web conference audio may be long, verbose, and contain lots of wasteful and extraneous discussion thus reducing the value of the electronic transcription.

In contrast to the above-described conventional approaches to saving web conference notes, improved techniques are directed to providing electronic text recommendations to a user based on content discussed during a conference (or meeting), e.g., predictive typing for taking notes based on content shared during an online meeting. The words and/or phrases in such predictive typing may be derived from the words spoken and/or from visual data displayed during the meeting. Accordingly, a user is able to effectively and efficiently document what is discussed with less typing and thus minimize distraction. Furthermore, the information that is documented can be made more on-point and less verbose than a lengthy electronic transcription of an entire audio feed.

One embodiment is directed to a computer-implemented method of providing electronic text recommendations to a user. The method includes capturing, by electronic circuitry, content from a conference among multiple participants. The method further includes receiving, by the electronic circuitry, electronic typing input from the user while the user is typing to document the conference. The method further includes outputting, by the electronic circuitry and in response to the electronic typing input from the user, electronic text recommendations to the user based on the captured content.

In some arrangements, capturing the content from the conference among the multiple participants includes electronically acquiring participant input that is shared among the multiple participants during the conference. In such an arrangement, capturing the content further includes identifying terms available for recommendation from the electronically acquired participant input that is shared among the multiple participants during the conference.

In some arrangements, the electronically acquired participant input includes human speech input. In these arrangements, identifying the terms from the electronically acquired participant input includes electronically transcribing the human speech input into an electronic transcription of the conference and detecting the terms from the electronic transcription.

In some arrangements, detecting the terms from the electronic transcription includes parsing the electronic transcription into portions of text based on pauses in speech during the conference. Such pauses enable the electronic circuitry to identify individual terms, i.e., separate words and phrases.

In some arrangements, outputting the electronic text recommendations includes assigning weights to the portions of text based on frequency of occurrence of each portion of text during a time period of the conference. The electronic text recommendations are then outputted based, at least in part, on the weights assigned to the portions of text.

In some arrangements, outputting the electronic text recommendations includes assigning weights to the portions of text based on a timestamp for each portion of text during a time period of the conference. The electronic text recommendations are then outputted based, at least in part, on the weights assigned to the portions of text.

In some arrangements, outputting the electronic text recommendations includes assigning weights to the portions of text based on audio amplitude for each portion of text. The electronic text recommendations are then outputted based, at least in part, on the weights assigned to the portions of text.

In some arrangements, outputting the electronic text recommendations includes selecting, from the terms available for recommendation, particular portions of text based on a numerical score for each portion of text. In some arrangements, the numerical score for each portion of text is based on (i) weighting that portion of text based on frequency of occurrence of that portion of text during a time period of the conference, (ii) weighting that portion of text based on a timestamp for that portion of text during the time period of the conference, and (iii) weighting that portion of text based on audio amplitude for that portion of text. The numerical scores may be based on other criteria as well, e.g., a standard dictionary, terms derived from video data, combinations thereof, and so on.

In some arrangements, parsing the electronic transcription into the portions of text includes identifying a first term spoken by a first participant of the conference, and identifying a second term spoken by a second participant of the conference. Accordingly, the recommendations provided to the user may be based on terms spoken by different participants.

In some arrangements, the electronically acquired participant input includes visual input displayed to the multiple participants during the conference. In these arrangements, identifying the terms available for recommendation from the electronically acquired participant input includes electronically recognizing text in the visual input displayed during the conference and detecting the terms from the electronically recognized text.

In some arrangements, electronically recognizing the text in the visual input includes performing a set of optical character recognition (OCR) operations on the visual input displayed during the conference to electronically recognize the text.

In some arrangements, outputting the electronic text recommendations includes selecting, from the terms available for recommendation, particular portions of text from the electronically recognized text based on screen locations and sizes of the particular portions of text. Other selection criteria are suitable for use as well such as text labels (e.g., title, subtitle, footnote, etc.), text color, whether the text is bolded, italicized, and so on.

In some arrangements, the method further includes, in response to the electronic typing input from the user, identifying, from the electronically acquired participant input, terms not to recommend to the user while the user is typing to document the conference. Along these lines, the electronic circuitry may purposefully omit recommending certain words or phrases based on prior user history (e.g., the user choosing not to accept the same recommendation multiple times, etc.).

In some arrangements, the electronic typing input is received from the user during the conference among the multiple participants. In these arrangements, outputting the electronic text recommendations to the user includes displaying, during the conference, a particular electronic text recommendation on an electronic display to the user in response to a particular character string of the electronic typing input matching a portion of the particular electronic text recommendation.

In some arrangements, the electronic typing input is received from the user after the conference has ended. In these arrangements, outputting the electronic text recommendations to the user includes displaying, after the conference has ended, a particular electronic text recommendation on an electronic display to the user in response to a particular character string of the electronic typing input matching a portion of the particular electronic text recommendation.

In some arrangements, the method further includes, after capturing the content from the conference among multiple participants and prior to receiving the electronic typing input from the user, persistently storing electronic text recommendation data in non-volatile memory. In these arrangements, the electronic text recommendation data represents terms available for recommendation which are derived from the captured content.

In some arrangements, the method further includes, in response to a command from the user to enter notes to document the conference and prior to receiving the electronic typing input from the user, reading the electronic text recommendation data from the non-volatile memory to obtain access to the electronic text recommendations. Such operation enables the user to save the recommendation context and later receive recommendations based on the save recommendation context at a later time, e.g., during a subsequent user session after a considerable amount of time has passed since the meeting ended.

Another embodiment is directed to an electronic apparatus that includes a user interface, memory, and control circuitry coupled to the user interface and the memory. The memory stores instructions that, when carried out by the control circuitry, cause the control circuitry to:
(A) capture content from a conference among multiple participants,
(B) receive electronic typing input from a user via the user interface while the user is typing to document the conference, and
(C) in response to the electronic typing input, output electronic text recommendations to the user via the user interface based on the captured content.

Yet another embodiment is directed to a computer program product having a non-transitory computer readable medium that stores a set of instructions to provide electronic text recommendations to a user. The set of instructions, when carried out by computerized circuitry, causes the computerized circuitry to perform a method of:
(A) capturing content from a conference among multiple participants;
(B) receiving electronic typing input from the user while the user is typing to document the conference; and
(C) in response to the electronic typing input, outputting electronic text recommendations to the user based on the captured content.

It should be understood that, in the cloud context, some electronic circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in providing a set of electronic text recommendations to a user.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a block diagram illustrating particular details of a dictionary of terms which are available for recommendation to the user.

DETAILED DESCRIPTION

An improved technique is directed to providing electronic text recommendations to a user based on content discussed during a conference, e.g., predictive typing for taking notes based on content shared during an online meeting. The words and/or phrases in such predictive typing may be derived from the words spoken and/or from visual data displayed during the conference. Accordingly, a user is able to document what is discussed with less typing and thus minimize the typing effort and distraction. Furthermore, the information that is documented can be made more on-point and less verbose than a lengthy electronic transcription of an entire audio feed.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
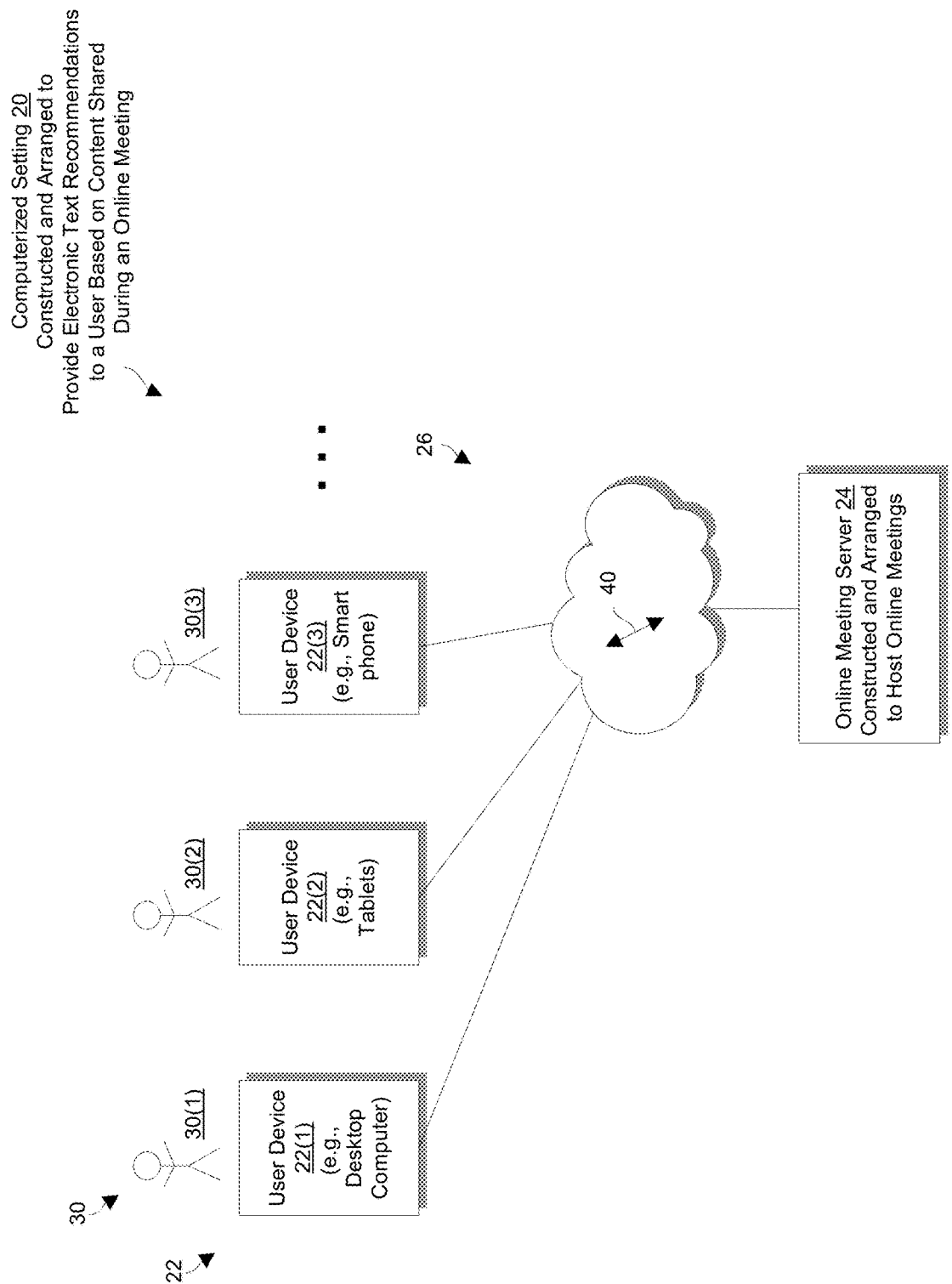
FIG. 1 is a block diagram of a computerized setting that provides electronic text recommendations to a user based on what is discussed during a meeting.

FIG. 1 shows a computerized setting 20 that provides electronic text recommendations to a user based on what is discussed during a meeting such as an online conference among multiple remote participants. The computerized setting 20 includes user devices 22(1), 22(2), 22(3), . . . (collectively, user devices 22), an online meeting server 24, and a communications medium 26.

Each user device 22 is operated by a respective user 30(1), 30(2), 30(3), . . . (collectively, users 30) and enables that user 30 to perform useful work (e.g., participate in online meetings, edit documents, send/receive email, etc.). Suitable user devices 22 include workstations, desktop computers, laptop computers, tablets, smart phones, and the like. Such user equipment is capable of locally installing and running an online meeting client application (or app) which enables that equipment participate in online meetings on behalf its respective user 30 (e.g., join meetings, schedule meetings, contribute audio feeds during meetings, present visual content during meetings, etc.).

The online meeting server 24 is constructed and arranged to reliably and robustly host online meetings among the users 30. To this end, the online meeting server 24 may include specialized circuitry (e.g., a video engine, an audio engine, etc.) to perform centralized content processing operations (e.g., distribution and adjustment of video content, mixing and distribution of audio content, etc.). In some arrangements, the online meeting server 24 is formed by multiple computers organized in a cluster. In other arrangements, the online meeting server 24 is formed by a server farm. In yet other arrangements, the online meeting server 24 is formed by distributed circuitry, i.e., the online meeting server 24 is located in the "cloud".

The communications medium 26 is constructed and arranged to connect the various components of the computerized setting 20 together to enable these components to exchange electronic signals 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, cellular communications, plain old telephone service (POTS) communications, combinations thereof, and so on.

During operation, the users 30 operate their respective user devices 30 to perform useful work. Among such work, the users 30 may create online meetings to exchange information via their user devices 22 from remote and/or distributed locations. During these online meetings and/or after these online meetings the users 30 are able to document what is discussed during the online meetings. To this end, a user 30 may enter text into a file to save notes of the online meeting. In particular, as the user 30 types in particular text into the user device 22, the user device 2 responds by offering text recommendations (e.g., words and phrases used during the online meeting), and the user 30 can select these text recommendations for entry into the file rather than type them out. Such text recommendations are based on what was just discussed or presented. As a result, the user's typing effort may be significantly reduced and the user 30 is able to direct more attention to the online meeting. Furthermore, since there is less typing, there is less distraction, if any, to the other participants. Further details will now be provided with reference to FIG. 2.

Figure 2:
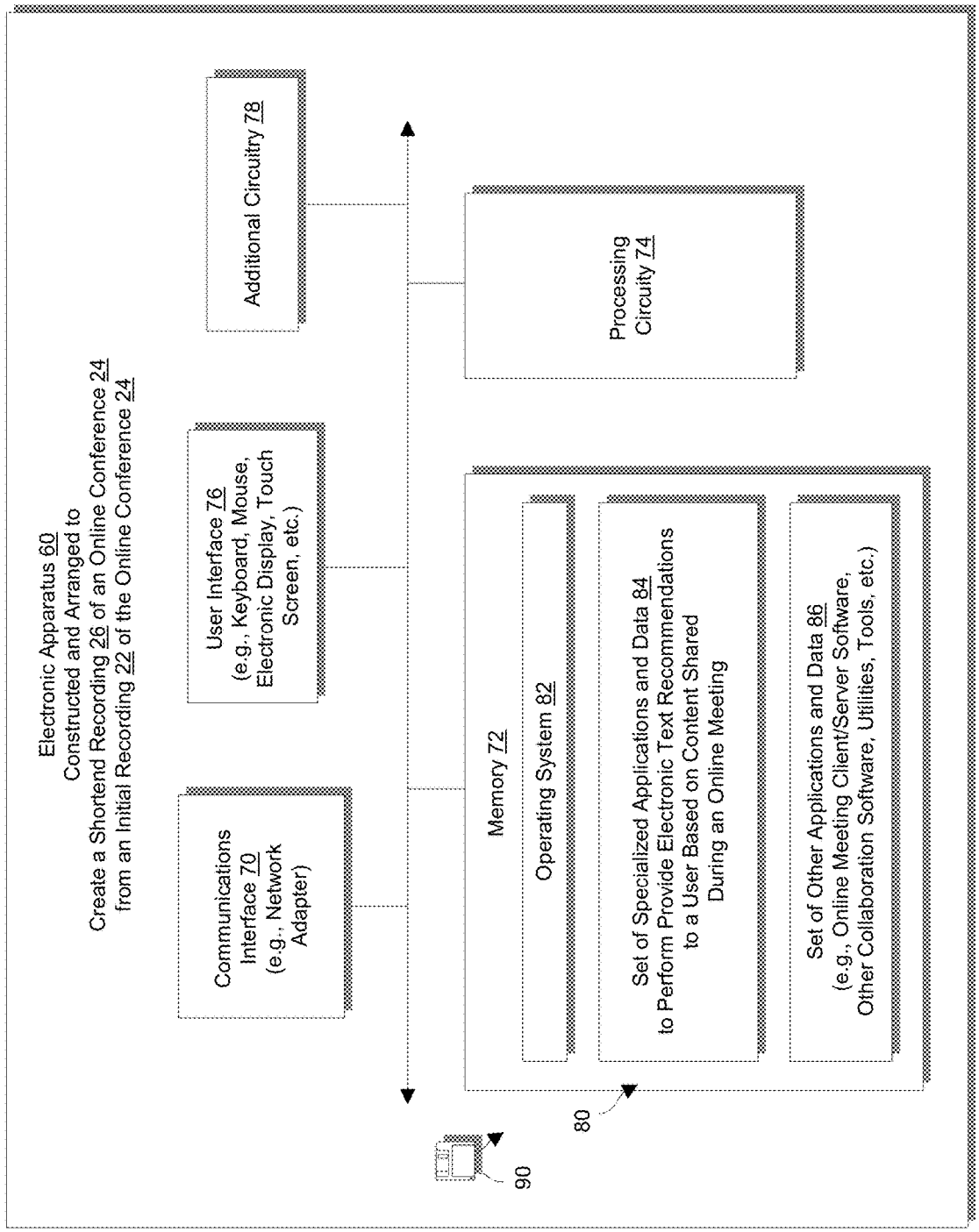
FIG. 2 is a block diagram of an electronic apparatus that is suitable for use in the computerized setting of FIG. 1.

FIG. 2 shows an electronic apparatus 60 which is suitable for use in the computerized setting 20 of FIG. 1. In particular, the electronic apparatus 60 is suitable for forming either a user device 22 or the online meeting server 24. As shown, the electronic apparatus 60 includes a communications interface 70, memory 72, processing circuitry 74, a user interface 76, and additional circuitry 78.

The communications interface 70 is constructed and arranged to connect the electronic apparatus 60 to the communications medium 26 (FIG. 1). Accordingly, the communications interface 70 enables the electronic apparatus 60 to communicate with the other components of the computerized setting 20. Such communications may be line-based and/or wireless (e.g., IP-based, cellular, combinations thereof, and so on).

The memory 72 is intended to represent both volatile storage (e.g., DRAM, SRAM, etc.) and non-volatile storage (e.g., flash memory, magnetic disk drives, etc.). The memory 72 stores a variety of software constructs 80 including an operating system 82, a set of specialized applications and data 84 to provide electronic text recommendations to a user based on content shared during an online meeting, and other applications and data 86.

The processing circuitry 74 is constructed and arranged to operate in accordance with the various software constructs 80 stored in the memory 72. In particular, the processing circuitry 74, when executing the operating system 82, manages various resources of the electronic apparatus 60 (e.g., memory allocation, processor cycles, hardware compatibility, etc.).

Additionally, the processing circuitry 74 operating in accordance with the set of specialized applications and data 84 forms specialized control circuitry to render electronic text recommendations to a user 30 for use. Such text recommendations are based on content discussed during an online meeting, e.g., predictive typing derived from the words spoken and/or from visual data displayed during the online meeting. Accordingly, the user 30 is able to document what is discussed with less typing and thus minimize the typing effort and distraction. Also, the information that is documented can be made more on-point and less verbose than a lengthy electronic transcription of an entire audio feed.

Furthermore, the processing circuitry 74 operating in accordance with the other applications and data 86 forms other specialized circuitry to perform other operations. If the electronic apparatus 60 is a user device 22, the other applications and data 86 may include an online meeting client application to enable the user 30 to schedule/join/etc. online meetings, a slide show application to present a slide show, a word processing application to open/edit/view a document, and a browser application to access websites, among others. On the other hand, if the electronic apparatus 60 is the online meeting server 24, the other applications and data 86 may include hosting and server-based applications, administrative tools, services and utilities, other service-style operations, and so on.

It should be understood that the above-mentioned processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic apparatus 60. The computer program product 90 includes a non-transitory and non-volatile computer readable medium that stores a set of instructions to control one or more operations of the electronic apparatus 60. Examples of suitable computer readable storage media include tangible articles of manufacture and apparatus that store instructions in a non-volatile manner such as CD-ROM, flash memory, disk memory, tape memory, and the like.

The additional circuitry 76 is constructed and arranged to perform other operations. Along these lines, for a user device 22, the additional circuitry 76 may include enhanced user interface equipment such as a camera to obtain visual content, an external microphone to obtain audio content, an external speaker, cellular telephone circuitry, etc. On the other hand, for the online meeting server 24, the additional circuitry 76 specialized mixing circuitry to combine audio feeds into an aggregated audio feed, a specialized database to manage enrolled users 30 for online meetings, and so on. Further details will now be provided with reference to FIG. 3.

Figure 3:
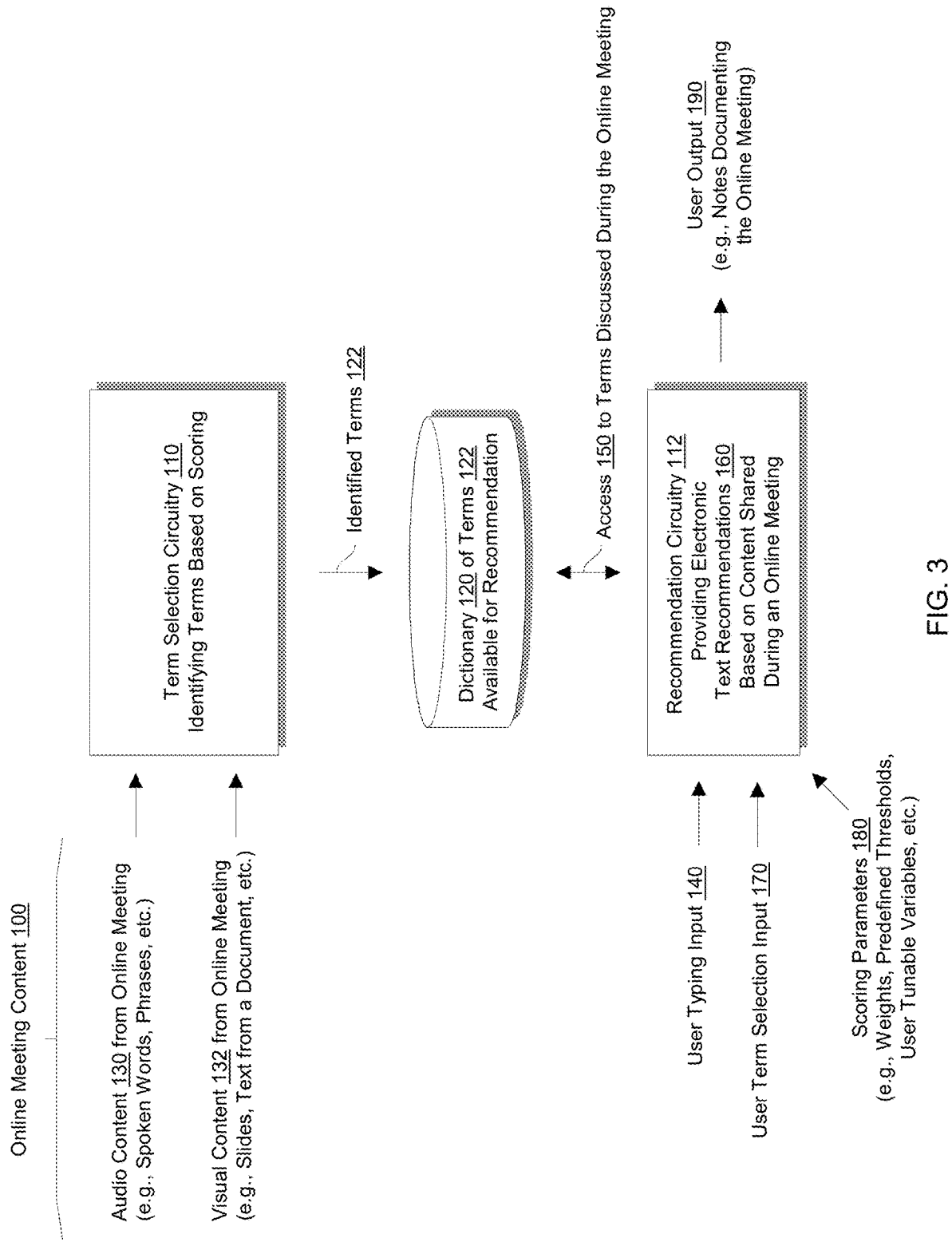
FIG. 3 is a block diagram of particular circuits of the electronic apparatus of FIG. 2.

FIG. 3 shows particular details of the operation of the electronic apparatus 60 when providing a user 30 with electronic text recommendations based on content 100 shared during an online meeting. Recall that the memory 72 of the electronic apparatus 60 stores a set of specialized applications and data 84 (also see FIG. 2). The set of specialized applications and data 84 includes specialized code that, when executed by the processing circuitry 74 of the electronic apparatus (FIG. 2), forms term selection circuitry 110 and recommendation circuitry 112. Additionally, the set of specialized applications and data 84 includes a specialized dictionary 120 of terms 122 which are available for recommendation.

During operation, the term selection circuitry 110 receives the online meeting content 100 and identifies terms 122 from the online meeting content 100. As illustrated in FIG. 3, the online meeting content 100 can include audio content 130 such as spoken words and phrases from the various meeting participants (e.g., an audio feed from each user device 22, also see FIG. 1). Additionally, the online meeting content 100 can include visual content 132 such as slide materials, materials from a document, views captured by a camera, etc. which is displayed by one or more users 30 during the online meeting.

For the audio content 130, the term selection circuitry 110 analyzes human speech input within the audio content 130 by electronically transcribing the human speech input into an electronic transcription of the meeting and detecting the terms 122 from the electronic transcription. To this end, the term selection circuitry 110 parses the electronic transcription into portions of text based on pauses during the meeting. Since the meeting includes multiple participants, such parsing may identify terms 122 spoken by different people, e.g., a first term 122 spoken by a first participant, a second term 122 spoken by a second participant, and so on. Once a term 122 is identified, the term selection circuitry 110 evaluates particular aspects of the term 122 such as audio amplitude, clarity, etc. to determine an amount of significance (i.e., a numerical significance score or value) for that term 122.

For the visual content 132, the term selection circuitry 110 analyzes the visual input displayed to the multiple participants during the conference by electronically recognizing portions of text in the visual input and detecting the terms 122 from the electronically recognized portions of text. If the visual input is in a bitmap format or a captured view from a camera, the term selection circuitry 110 performs a set of optical character recognition operations on the visual input to electronically recognize terms 122. Once a term 122 is identified, the term selection circuitry 110 evaluates particular aspects of the term 122 such as screen location, text size, font type, labels, color, whether the characters are in bold, italics, underlined, etc. to determine an amount of significance for that term 122.

The term selection circuitry 110 then saves significant terms 122 in the dictionary 120, i.e., pre-filtered/detected terms 122 having amounts of significance that exceed a predefined significance threshold. The term selection circuitry 110 saves particular aspects of the significant terms 122 as well such as the term 122 itself, a timestamp for the term 122, and a tally of how many times that term 122 has been detected during the meeting, and so on.

With the terms 122 in the dictionary 120 available for recommendation, the recommendation circuitry 112 is now able to respond to user typing by providing electronic text recommendations based on the online meeting content 100. In particular, the user 30 operates the user device 22 of the user 30 (FIG. 1) by providing typing input 140. In response to the typing input 140, the recommendation circuitry 112 accesses the dictionary 120 of terms 122 (see the double arrow 150 in FIG. 3) and offers electronic text recommendations 160 from the dictionary 120 of terms 122 to improve the user's experience (e.g., offering words and/or phrases that match an initial string of characters that the user has typed). The user 30 is then able to enter term selection input 170 (e.g., a mouse click, a swipe/gesture on a touch screen, etc.) and thus simply select the electronic text recommendations 160 rather than be burdened by typing out an entire term 122. Such operation saves typing and allows the user 30 to focus more on the meeting. Moreover, the reduction in typing means there is less distraction if any to other participants in the meeting.

In some arrangements, the recommendation circuitry 112 performs a set of evaluation operations based on scoring parameters 180 (e.g., weights, predefined thresholds, user tunable variables, etc.) to determine whether to recommend terms 122 to the user 30 when the user 30 types. Such operations generate numerical scores for the terms in the dictionary 120 and only offer terms 122 when the numerical scores for those terms 122 exceed certain thresholds.

By way of example, the following formula can be used to provide a match-and-recency (MAR) score to a term 122:

MAR Score=Prefix Match Score*Theta(Confidence Score−Confidence Threshold)*($W1$*Recency Score+$W2$*Confidence Score+$W3$*Emphasis Score)

where the Prefix Match Score is a numerical measure of a comparison between a string of typed characters following a whitespace and the beginning of the particular term, where Theta is a step function which applies a confidence threshold on whether a term is included (or not), where the Confidence Score is a numerical measure of correctness that the electronic circuitry encountered the particular term (i.e., confidence that a word/phrase was heard or seen), where the Confidence Threshold is a tunable confidence/correctness parameter, where the Recency Score indicates how recently the term was heard/seen (e.g., calculated as 1−(Current time−Last Time the term was heard/seen)/Recency Window and the Recency Window may be a minute or a couple of minutes), wherein the Emphasis Score is a numerical measure of how much emphasis the person contributing the term placed on that term (e.g., based on amplitude of a spoken term, location/size/etc. of a displayed term, etc.), and wherein the weights W1, W2, and W3 are tuned to provide effective results (e.g., initially set as defaults and adjusted over time to accommodate the user).

It should be understood that other formulae are suitable for use as well (also see the scoring parameters 180 in FIG. 3). The end result is a well-defined, systematic schema that is able to smartly decide which terms 122 to recommend to the user 30 as the user types.

As the user 30 continues to provide the typing input 140 and term selection input 170, the recommendation circuitry 112 provides user output 190 (i.e., the user's typing input 140 and the recommended terms 122 selected by the user 30) which can be viewed, stored, etc. (e.g., notes that document the online meeting).

It should be understood that the recommendation circuitry 112 updates the dictionary 120 to indicate how often the terms 122 are selected by the user 30. Such updates then influence future electronic text recommendations 160. For example, if the user 30 routinely selects a particular term 122, the recommendation circuitry 112 will continue to offer that term 122 when it detects the user 30 starting to type that term 122. However, if the routinely does not selects a particular term 122, the recommendation circuitry 112 will discontinue offering that term 122 when it detects the user 30 starting to type that term 122.

In some arrangements, a user 30 provides the typing input 140 during an online meeting, and the recommendation circuitry 112 offers recommendations 160 to the user 30 from the dictionary 120 on the fly, i.e., during the online meeting. For example, the user 30 may be a participant of the online meeting and wish to take notes in real time. In this situation, the term selection circuitry 110 continues to update the dictionary 120 of terms 122 dynamically during the online meeting. In particular, some terms 122 may become "hot" due to how recent the terms 122 came up during the online meeting making such terms likely to be recommended. However, other terms 122 that have been "hot" may become "stale" or "cold" if a significant amount of time has passed since encountering those terms 122 (e.g., five minutes, 10 minutes, etc.). Similarly, some terms 122 that were "stale" may become "hot" again if the frequency of use of the terms 122 increases later in the discussion.

In other arrangements, a user 30 provides the typing input 140 after an online meeting, and the recommendation circuitry 112 offers recommendations 160 to the user 30 from the dictionary 120 even though the online meeting has ended. For example, the user 30 may wish to document the high points of an online meeting at some point after the online meeting concluded. In this situation, the dictionary 120 of terms 122 is saved indefinitely in storage (also see the specialized application and data 84 in FIG. 2) for subsequent access/use by the user 30.

When the user 30 types notes offline while receiving recommendations from an earlier-held online meeting, the user 30 may concurrently view content from the online meeting while typing the notes or simply type the notes without concurrently reviewing the online meeting content. For the purpose of calculating recency scores, if the user 30 is concurrently replaying the online meeting content, the current time is the particular time within in the recorded online meeting that is currently being replayed by the user 30. However, if the user 30 is not concurrently replaying the online meeting content, the electronic apparatus 60 can infer, as the current time, the current location/context in the online meeting by matching saved contexts against the last several words or lines of text typed by the user 30 (e.g., the last 5-10 words that were typed). Further details will now be provided with reference to FIG. 4.

FIG. 4 shows an example database 200 having a format which is suitable for use as a dictionary 120 of terms 122 that is generated and updated by the term selection circuitry 110 and the recommendation circuitry 112 (also see FIG. 3). As shown, the example database 200 includes database entries 210(1), 210(2), 210(3), . . . (collectively, database entries 210) that store terms 122 available for recommendation.

Each entry 210 has a set of fields 220 including a term field 222, a timestamp field 224, a times recently encountered field 226, a total times encountered field 228, a total times selected field 230, and other fields 232.

The term field 222 of each entry 210 is constructed and arranged to store the actual term 122 itself, i.e., words and/or phrases such as "cholesterol", "cardiovascular disease", "systolic blood pressure", . . . in the example. The minimum and maximum lengths of the terms 122 can be predefined.

The timestamp field 224 of each entry 210 stores a timestamp of when the term 122 of that entry 210 occurred during a meeting. Accordingly, the recommendation circuitry 112 is able to smartly recommend or not recommend terms 122 based on how recently the terms 112 were detected during a meeting (i.e., based on a comparison of the timestamp with current time).

The times recently encountered field 226 stores a count of how many times that term 122 has been encountered within a particular recent time window. Such a count is essentially a running tally of how many times the term 122 was discussed within the last X minutes (e.g., one minute, two minutes, five minutes, etc.). In some arrangements, the contents of this field 226 are updated by the term selection circuitry 110. In other arrangements, the contents of this field 226 are updated by the recommendation circuitry 112. In yet other arrangements, the contents of this field 226 are updated by the term selection circuitry 110 and the recommendation circuitry 112.

The total times encountered field 226 stores a count of how many times that term 122 has been encountered in total. Such a count is a running tally of how many times the term 122 was discussed during the meeting.

The total times selected field 230 stores a count of how many times the user has selected the term 122 while documenting the meeting. Such a count can assist the recommendation circuitry 112 to recommend a term 122 even if that term 122 has not been discussed frequently during the meeting. Additionally, such a count can assist the recommendation circuitry 112 to not recommend a term 122 even if that term 122 has been discussed very often during the meeting (e.g., if the user 30 has consistently or frequently disregarded the recommendation 160).

The other fields 232 store additional information such as the most recent weights that were used for each term 122, the most recent numerical scores that were calculated for each term 122, source information for each term 122, and so on. Such information is well suited for enabling the recommendation circuitry 112 to smartly recommend and/or not recommend terms 122 to the user 30. Further details will now be provided with reference to FIG. 5.

Figure 5:
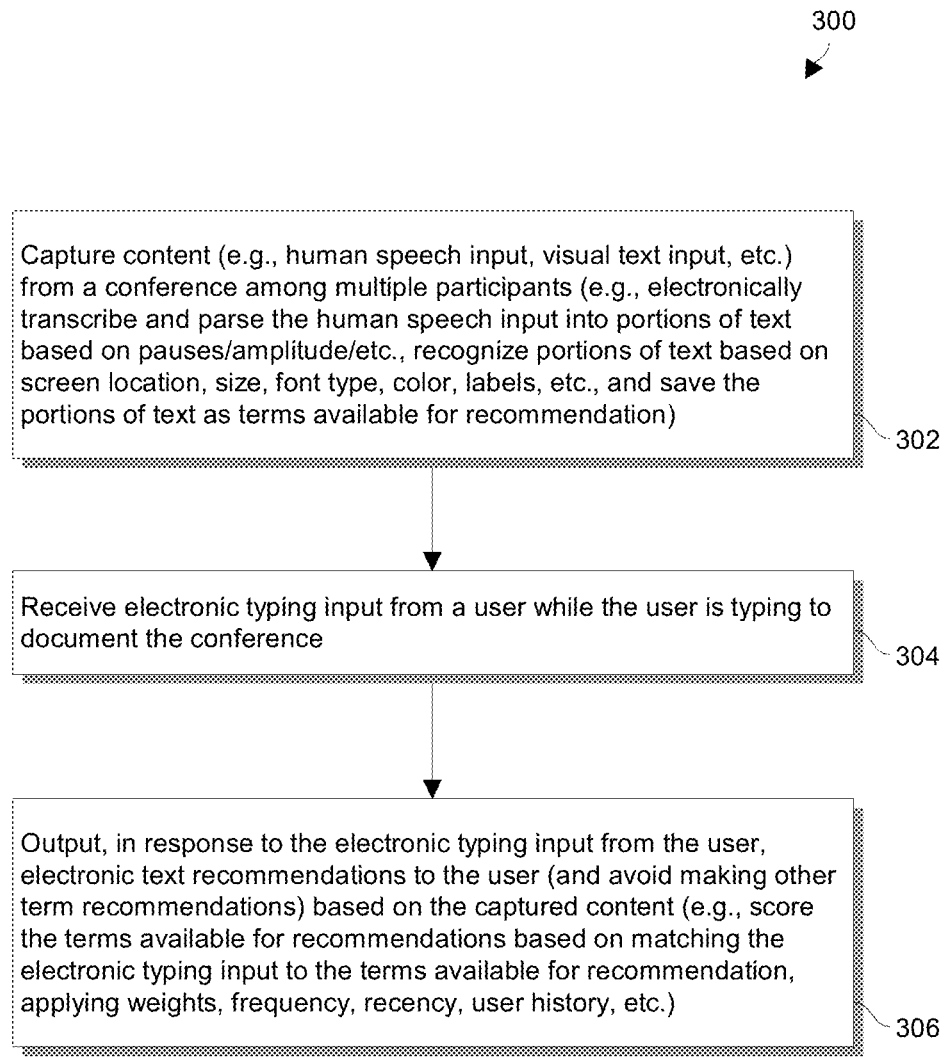
FIG. 5 is a flowchart of a procedure that is performed by the computerized setting of FIG. 1.

FIG. 5 is a flowchart of a procedure 300 that is performed by the electronic circuitry of FIG. 3 to provide electronic text recommendations 160 to a user 30 based on audio input and/or visual input from a meeting.

At 302, the electronic circuitry captures content from a conference among multiple participants. In particular, the electronic circuitry analyzes human speech input from the audio input (e.g., by electronically transcribing the audio input into an electronic transcription and parsing the electronic transcription based on pauses, amplitude, etc.). Additionally, the electronic circuitry analyzes text from the visual input (e.g., by recognizing text, by gauging significance based on screen location/text size/font type/text color/etc.).

At 304, the electronic circuitry receives electronic typing input from the user while the user is typing to document the conference. Here, after a whitespace, the user may type a few characters of an intended character string (e.g., "cho" when typing the term "cholesterol").

At 306, the electronic circuitry outputs, in response to the electronic typing input from the user, electronic text recommendations to the user based on the captured content. In particular, the electronic circuitry generates numerical scores for the terms available for recommendation based on matching the few typed characters to entries in a dictionary of terms, and applying weights to particular scoring criteria such as frequency, recency, and so on. The electronic circuitry then compares the numerical scores to a predefined threshold to determine whether to recommend any of the terms. Also, if the user has not selected recommended terms, the electronic circuitry is able to learn from the user history and avoid making the non-selected recommendations in the future.

As described above, improved techniques are directed to providing electronic text recommendations 160 to a user 30 based on content 100 discussed during a conference (or meeting), e.g., predictive typing for taking notes based on content shared during an online meeting. The words and/or phrases in such predictive typing may be derived from the words spoken and/or from visual data displayed during the meeting. Accordingly, the user 30 is able to effectively and efficiently document what is discussed with less typing and thus minimize distraction. Furthermore, the information that is documented can be made more on-point and less verbose than a lengthy electronic transcription of an entire audio feed.

Additionally, one should appreciate that this above-described techniques amount to more than simply providing word recommendations. Rather, the techniques involve recommending portions of text based on what was discussed during a meeting based on content 100 captured from that meeting. Thus, the user 30 is able to significantly reduce typing, focus more on the meeting, and minimize distractions to other meeting participants.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic apparatus 60 (FIG. 2) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

Additionally, it should be understood that the process of providing such recommendations to the user may be performed in real time during a meeting. Alternatively, the context for providing such recommendations can be stored persistently and therefore enabling the user to enjoy receiving such recommendations even after the meeting has ended and time has passed.

Moreover, it should be understood that the above-described improvements can be applied to venues other than online meetings or conferences. For example, the improvements can be applied to in-person meetings, individual dictation, documenting a video, and so on.

Based on the above, one should appreciate that people often take notes to summarize meetings. One may argue that transcripts can replace notes but automated transcriptions usually have an unacceptably high error rate. Even if the transcripts are perfect, they are not as effective because spoken language can be verbose, have repetitions, incomplete sentences, corrections and interruptions. Furthermore, automatic summarization is a hard problem that is yet to be solved. Even if summarized notes could be generated automatically, many users want to have complete control over their notes. Additionally, typing/writing notes during a meeting offers more control, but it is distracting and makes it difficult to keep up with the meeting. However, the improvements described herein are able to assist users to efficiently capture notes while keeping up with the meeting.

It should be further appreciated that, when someone in a meeting is taking notes, most of what they capture is based on what is being discussed at the time. The improvements enable the user to quickly and efficiently capture most or all of what is being discussed by monitoring the live audio and screen-sharing feeds, and based on the words mentioned/shown recently, recommending keywords and phrases as the note-taker types notes.

In some arrangements, the electronic circuitry listens to audio captured via a computer/smartphone/tablet/etc. microphone in real time. The electronic circuitry transcribes and segments the audio in to portions of text (i.e., words and/or phrases) based pauses in speech. As the transcriptions are completed, phrases and keywords are stored along with the time-stamps of when they were spoken.

In some arrangements, the electronic circuitry obtains a presentation or other visual aids with other attendees. If needed, OCR and other operations are used to detect keywords and phrases on the screen being shared. Phrases and keywords are then stored along with the time-stamps of when they were last shown.

When the user is ready to input notes and receive electronic text recommendations, the user starts typing a new word. In response, the electronic circuitry recommends a number of stored keywords based on their Match-And-Recency (MAR) scores. If no matches are found, the electronic circuitry is able to use standard approaches for predictive keyboards along with a word dictionary/language model tuned to historical keywords and phrases.

It should be understood that the note-taker can choose to include the suggested keywords or phrases in their notes or ignore them. This process continues with the electronic circuitry suggesting keywords and phrases.

In connection with MAR scores, the MAR scores may be combinations of individual scores or subscores. Furthermore, the weights may be tuned to give good results. Moreover, the calculations may be adjusted to ensure that only terms whose prefixes match the typed characters are selected, while the weighted sum allows trade-offs and/or balancing between the recency, confidence and emphasis.

In some arrangements, Prefix Match Scores indicate comparisons between each typed prefix (set of typed characters after a whitespace) and the beginning of each stored keyword or phrase. For example, if there is a match the score is 1. Otherwise, the score is 0.

In some arrangements, Recency Score indicate how recent the terms are. Such Recency Scores can be calculated as:

> 1−(Current time−Last Time the word/phrase was seen/heard)/Recency Window, where the Recency Window is about a couple of minutes.

In some arrangements, Confidence Scores indicate how confidence there is in that the word/phrase was seen or heard. The Confidence Scores may be output the speech recognition or OCR process. For example, the values may range between 0 and 1.

In some arrangements, Emphasis Scores indicate whether the term was emphasized by the presenter. Here are some examples:
1. Speech: Louder is rated higher. The process keeps track of the loudness of the words in a Recency Window and calculates relative loudness for each term, normalized against the loudest term.
2. Screen Capture: Title/bigger/different font/color. The process tracks the terms shown in the Recency Window, and calculate the relative height of the word compared to the tallest word. Furthermore, for italics/bold/underline, the process may multiply the font height by 2. Similarly, for each color, the process assigns a multiplicative factor to account for how noticeable it is. E.g. Red—2. Green—1.25. Yellow—1.5, etc.

In some arrangements, the electronic circuitry always listens/watches for words. In other arrangements, the electronic circuitry invokes the listen/watch mode based on user input.

One should further appreciate that the above-described improved techniques may be integrated into and/or combined with various collaboration products. Suitable products include online meeting products, social media products, collaborative training products, and so on. In some arrangements, the techniques provide a tool (e.g., for customer care agents to take notes while focusing on a customer call, to create a to-do list based on a recent phone call with a manager/sales lead/etc., by a healthcare provider/lawyer/journalist/etc.). In some arrangements, the improved techniques are used to generate keywords encountered during the day to customize new feeds, and so on. Such modifications and enhancements are intended to belong to various embodiments of the disclosure.

What is claimed is:

1. A computer-implemented method of providing electronic text recommendations to a user, comprising:
   capturing, by electronic circuitry, content from a conference among multiple participants, at least in part by identifying terms available for recommendation from electronically acquired participant input that includes visual input displayed to the multiple participants during the conference, wherein identifying terms available for recommendation from the visual input displayed during the conference includes detecting terms in the visual input displayed during the conference at least in part by performing optical character recognition operations on the visual input displayed during the conference;
   receiving, by the electronic circuitry during the conference among the multiple participants, electronic typing input from the user while the user is typing text into a file that is separate from the conference to document the conference; and
   in response to the electronic typing input from the user:
      generating, by the electronic circuitry, a numerical score for each term available for recommendation that was identified from the visual input displayed during the conference, wherein the numerical score indicates how much visual emphasis was placed on the term in the visual input displayed during the conference, and is based on i) a relative size of the term compared to a size of a tallest word of the visual input displayed within a most recent time window during the conference, ii) how noticeable a color of the term is, iii) how recently the term was captured relative to a current time, and iv) a comparison of the term to the electronic typing input, and wherein generating the numerical score includes assigning a first multiplicative factor to terms displayed in a first color and assigning a second multiplicative factor to terms displayed in a second color, and
      outputting, by the electronic circuitry, electronic text recommendations based on the captured content, at least in part by automatically selecting, from the terms available for recommendation, particular terms for recommendation having numerical scores that exceed a predetermined threshold, and wherein the outputting includes i) displaying the electronic text recommendations to the user in a user interface in an electronic display, and ii) automatically storing at least one term of the electronic text recommendations into the file that is separate from the conference in response to selection of the term by the user within the user interface.

2. A computer-implemented method as in claim 1 wherein the electronically acquired participant input further includes human speech input; and
   wherein identifying the terms available for recommendation from the electronically acquired participant input further includes electronically transcribing the human speech input into an electronic transcription of the conference and identifying terms available for recommendation from the electronic transcription.

3. A computer-implemented method as in claim 2 wherein identifying terms available for recommendation from the electronic transcription further includes:
   parsing the electronic transcription into portions of text based on pauses during the conference.

4. A computer-implemented method as in claim 3, further comprising:
   generating, by the electronic circuitry, numerical scores for each term available for recommendation that was identified from the electronic transcription at least in part by assigning weights to the terms based on audio amplitude for each term.

5. A computer-implemented method as in claim 4 wherein generating the numerical score for each for each term available for recommendation that was identified from the electronic transcription further comprises (i) weighting the term based on frequency of occurrence of the term during a most recent time window during the conference, and (ii) weighting the term based on a timestamp for the term indicating a time at which the term occurred during the conference.

6. The method of claim 5, wherein the most recent time window during the conference comprises a most recent predetermined number of minutes occurring during the conference; and
wherein weighting each term available for recommendation that was identified from the electronic transcription based on audio amplitude further includes assigning relatively higher weightings to those terms occurring within the most recent time window having relatively higher audio amplitudes than other terms occurring within the most recent time window.

7. The method of claim 6, wherein weighting each term available for recommendation that was identified from the electronic transcription based on a timestamp for that term includes comparing the timestamp to a current time and assigning relatively higher weightings to those terms having timestamps that are relatively closer to the current time.

8. The method of claim 6, wherein weighting each term available for recommendation that was identified from the electronic transcription further includes assigning relatively higher weightings to those terms that have previously been selected by the user from previously output electronic text recommendations more often than other terms.

9. A computer-implemented method as in claim 3 wherein parsing the electronic transcription into the portions of text includes:
identifying a first term spoken by a first participant of the conference, and
identifying a second term spoken by a second participant of the conference.

10. A computer-implemented method as in claim 1 wherein generation of the numerical score for each term available for recommendation that was identified from the visual input displayed during the conference is further based on a screen location of the term.

11. A computer-implemented method as in claim 1, further comprising:
in response to the electronic typing input from the user, identifying, from the electronically acquired participant input, terms not to recommend to the user while the user is typing to document the conference.

12. A computer-implemented method as in claim 1 wherein outputting the electronic text recommendations to the user includes displaying, during the conference, a particular one of the terms available for recommendation on the electronic display in response to a particular character string of the electronic typing input matching a portion of the particular term.

13. A computer-implemented method as in claim 1, further comprising:
after capturing the content from the conference among multiple participants and prior to receiving the electronic typing input from the user, persistently storing electronic text recommendation data in non-volatile memory, the electronic text recommendation data representing terms available for recommendation which are derived from the captured content.

14. A computer-implemented method as in claim 13, further comprising:
in response to a command from the user to enter notes to document the conference and prior to receiving the electronic typing input from the user, reading the electronic text recommendation data from the non-volatile memory to obtain access to the electronic text recommendations.

15. The method of claim 1, wherein the electronic text recommendations are output to the user based on how recently terms in the captured content were captured relative to a current time such that terms occurring more recently relative to the current time are more likely to be included in the electronic text recommendations.

16. The method of claim 1, wherein capturing the content from the conference includes obtaining the visual input displayed during the conference through a camera before performing the optical character recognition operations on the visual input displayed during the conference.

17. An electronic apparatus, comprising:
a user interface;
memory; and
control circuitry coupled to the user interface and the memory, the memory storing instructions that, when carried out by the control circuitry, cause the control circuitry to:
capture content from a conference among multiple participants, at least in part by identification of terms available for recommendation from electronically acquired participant input that includes visual input displayed to the multiple participants during the conference, wherein identification of terms available for recommendation from the visual input displayed during the conference includes detection of terms in the visual input displayed during the conference at least in part by performance of optical character recognition operations on the visual input displayed during the conference,
receive, during the conference among the multiple participants, electronic typing input from a user via the user interface while the user is typing text into a file that is separate from the conference to document the conference, and
in response to the electronic typing input:
generate a numerical score for each term available for recommendation that was identified from the visual input displayed during the conference, wherein the numerical score indicates how much visual emphasis was placed on the term in the visual input displayed during the conference, and is based on i) a relative size of the term compared to a size of a tallest word of the visual input displayed within a most recent time window during the conference, ii) how noticeable a color of the term is, iii) how recently the term was captured relative to a current time, and iv) a comparison of the term to the electronic typing input, and wherein generating the numerical score includes assigning a first multiplicative factor to terms displayed in a first color and assigning a second multiplicative factor to terms displayed in a second color, and
output electronic text recommendations based on the captured content, at least in part by automatic selection, from the terms available for recommendation, of particular terms for recommendation having numerical scores that exceed a predetermined threshold, and wherein the electronic text recommendations are output by i) displaying the electronic text recommendations to the user for user selection via the user interface, and ii) automatically storing at least one term of the electronic text recommendations into the file that is separate from the conference in response to selection of the term by the user within the user interface.

18. A computer program product having a non-transitory computer readable medium that stores a set of instructions to provide electronic text recommendations to a user; the set of instructions, when carried out by computerized circuitry, causing the computerized circuitry to perform a method of:

capturing content from a conference among multiple participants, at least in part by identifying terms available for recommendation from electronically acquired participant input that includes visual input displayed to the multiple participants during the conference, wherein identifying terms available for recommendation from the visual input displayed during the conference includes detecting terms in the visual input displayed during the conference at least in part by performing optical character recognition operations on the visual input displayed during the conference;

receiving, during the conference among the multiple participants, electronic typing input from the user while the user is typing text into a file that is separate from the conference to document the conference; and in response to the electronic typing input, generating, by the electronic circuitry, a numerical score for each term available for recommendation that was identified from the visual input displayed during the conference, wherein the numerical score indicates how much visual emphasis was placed on the term in the visual input displayed during the conference, and is based on i) a relative size of the term compared to a size of a tallest word of the visual input displayed within a most recent time window during the conference, ii) how noticeable a color of the term is, iii) how recently the term was captured relative to a current time, and iv) a comparison of the term to the electronic typing input, and wherein generating the numerical score includes assigning a first multiplicative factor to terms displayed in a first color and assigning a second multiplicative factor to terms displayed in a second color, and outputting electronic text recommendations based on the captured content, at least in part by automatically selecting, from the terms available for recommendation, particular terms for recommendation having numerical scores that exceed a predetermined threshold, and wherein the outputting includes i) displaying the electronic text recommendations to the user in a user interface in an electronic display, and ii) automatically storing at least one term of the electronic text recommendations into the file that is separate from the conference in response to selection of the term by the user within the user interface.

* * * * *